United States Patent
Lanigan, Sr. et al.

(10) Patent No.: US 8,876,426 B2
(45) Date of Patent: Nov. 4, 2014

(54) OUTER BOX CONNECTOR AND METHOD THEREOF

(76) Inventors: John J. Lanigan, Sr., Orland Park, IL (US); Peter W. Mirabella, Schereville, IN (US); Antonio Carlos Callado de Souza, Orland Park, IL (US)

(*) Notice: Subject to any disclaimer, the term of this patent is extended or adjusted under 35 U.S.C. 154(b) by 1301 days.

(21) Appl. No.: 12/657,785

(22) Filed: Jan. 28, 2010

(65) Prior Publication Data
US 2011/0180558 A1  Jul. 28, 2011

(51) Int. Cl.
*F16D 1/00* (2006.01)
*B61D 45/00* (2006.01)
*B60P 7/13* (2006.01)
*B61D 47/00* (2006.01)
*B65D 90/00* (2006.01)
*B65G 63/00* (2006.01)

(52) U.S. Cl.
CPC .............. *B61D 45/007* (2013.01); *B60P 7/132* (2013.01); *B61D 47/00* (2013.01); *B65D 90/0006* (2013.01); *B65G 63/004* (2013.01)
USPC ....................................................... 403/353

(58) Field of Classification Search
USPC .......... 403/321, 322.4, 348, 376, 353; 70/211, 70/212
See application file for complete search history.

(56) References Cited

U.S. PATENT DOCUMENTS

| | | | | |
|---|---|---|---|---|
| 1,066,806 A * | 7/1913 | Freud | ............................. | 248/244 |
| 3,512,653 A * | 5/1970 | Erismann | ...................... | 211/192 |
| 3,545,626 A * | 12/1970 | Seiz | ............................. | 211/192 |
| 3,612,290 A * | 10/1971 | Evans | ........................... | 211/192 |
| 3,626,487 A * | 12/1971 | Seiz | ............................. | 211/192 |
| 3,891,172 A * | 6/1975 | Einhorn | ................... | 248/220.43 |
| 4,474,492 A * | 10/1984 | Fleitas | ........................ | 403/322.4 |
| 5,184,853 A * | 2/1993 | Whatley | ....................... | 292/205 |
| 5,791,502 A * | 8/1998 | Bietz et al. | ................... | 211/192 |
| 6,352,164 B1 * | 3/2002 | Hyatte et al. | ................. | 211/192 |
| 6,748,776 B2 * | 6/2004 | Bullock et al. | .................. | 70/212 |
| 7,984,883 B2 * | 7/2011 | Li et al. | ..................... | 248/125.7 |
| 8,474,756 B2 * | 7/2013 | Allain et al. | ............... | 244/118.6 |
| 2007/0018047 A1 * | 1/2007 | Wodak | ...................... | 244/122 R |

* cited by examiner

*Primary Examiner* — Michael P Ferguson
*Assistant Examiner* — Daniel Wiley (57) ABSTRACT

An outer box connector (OBC) (100) and methods (200 and 250) are shown and described. The OBC (100) can include: a body (102) having an outer surface (104) and an inner surface (106); a first anchor (108) and a second anchor (110) extending inwardly from the inner surface (104); a lever (112) extending substantially outwardly from the outer surface (104), the lever (112) being connected to a distal portion (114) of the first anchor (108); and the first anchor (108) including an unlocked condition (116) adapted for allowing insertion in and removal from a corner fitting (120) and a locked condition (118) for locking the first anchor 108 with a corner fitting (12). Advantageously, the OBC (100) and methods allow simplified container handling and connection and disconnection, in transportation applications.

9 Claims, 6 Drawing Sheets

OUTER BOX CONNECTOR AND METHOD THEREOF

FIELD OF THE INVENTION

The present invention relates generally to the transportation and intermodal industry, and more particularly, to an outer box connector (OBC) and method thereof.

BACKGROUND OF THE INVENTION

Over the years, congestion at port and inland terminals has grown. For congestion, energy and environmental reasons, rail has become a preferable option for inland freight distribution. Despite the relatively high embedded costs in connection with intermodal rail, rail is currently an attractive option for containerized goods carried over long distances. Among the embedded costs, there is a need to improve and make more efficient the multiple operations required for transfers.

Thus, there is a need to make new terminal designs and automated transfer management systems at terminals, hubs and distribution centers. This could result in efficiency advances and productivity gains to improve the economics for both long and short haul intermodal movements, including port shuttle trains. New handling systems and apparatus could lower fixed costs and make the intermodal sector more price competitive, improve time and reliability and make the intermodal sector more service competitive.

There is a need to automate, improve and better manage the handling of containers and minimize congestion at terminals, hubs and distribution centers. There is a need to improve terminal dwell time. Terminal dwell time is an important factor affecting railroad network efficiency. The more reliable and efficient the terminals (shorter average terminal dwell times, shorter time buffers and smaller capacity buffers), the more fluid the network, and consequently the greater the average train speeds. Equipment utilization improves as well as fewer well cars and locomotives are needed to move traffic because the equipment is cycled faster.

Further, there is a need for transfer operations to be streamlined. Currently, intermodal operations are equipment- and labor-intensive. The costs of providing a terminal facility includes the gate system and gate personnel, hostler and hostler drivers, employees who check for mis-parked containers, and security personnel. For the trackside loading/unloading of containers, this includes gantry cranes and operators, and personnel to secure and release the inter box connectors (IBC's) for double stack railcars. For chassis storage and the remote container storage yard, a storage yard supervisor, and two or more cranes and crane operators.

Design capacity of the terminal is an issue as well. Whenever a terminal begins to exceed its design capacity (e.g., low stack to high stack container storage), manning and equipment costs for ground operations begin to increase dramatically, making transfer operations increasingly less competitive.

Figure 1:
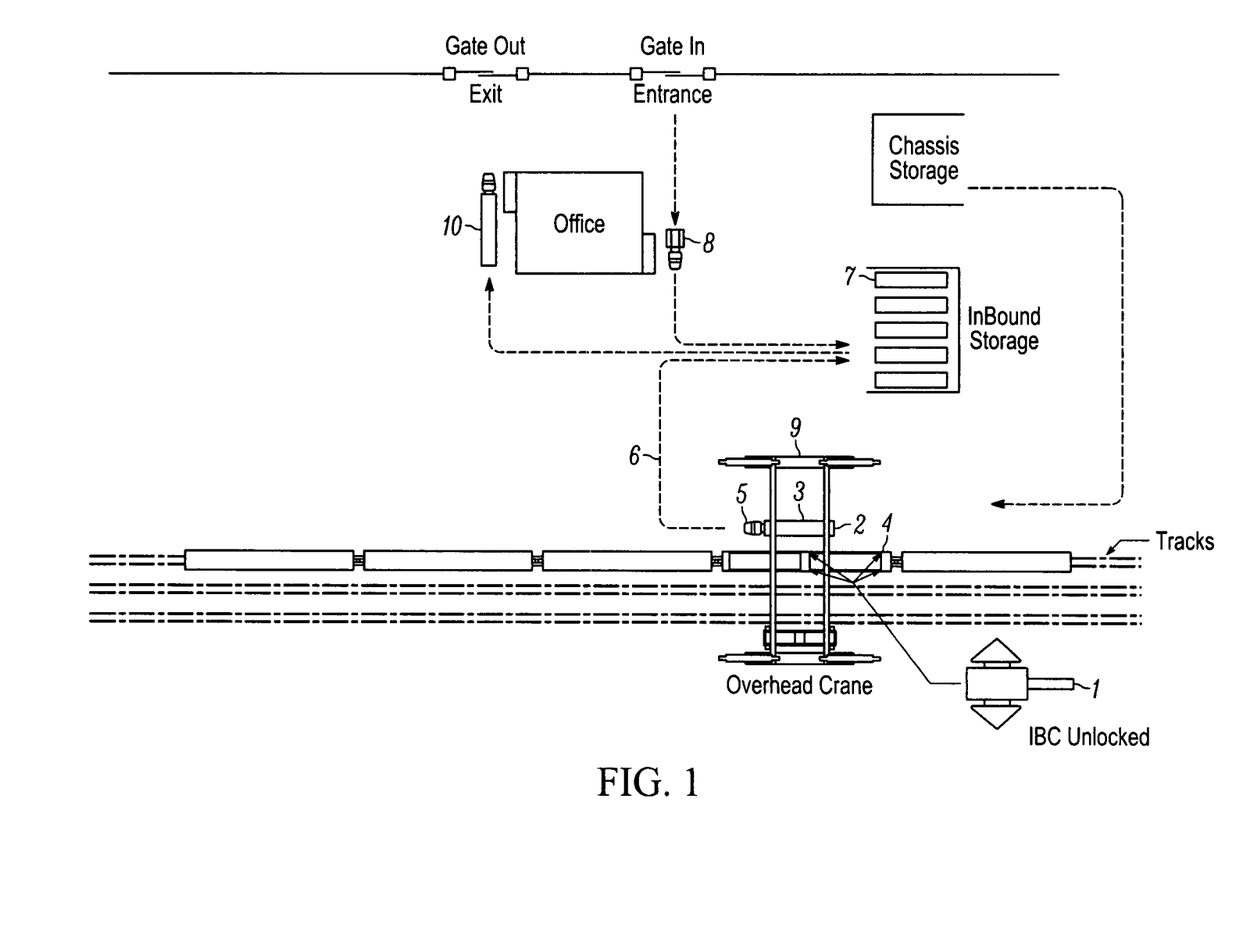
FIG. 1 is a simplified overhead view of a conventional intermodal transfer operation at a rail terminal, showing labor- and equipment-intensive operations required with the use of inter box connectors (IBC's) with container corner castings.

Referring to FIG. 1, a simplified overhead view of a conventional intermodal transfer at a rail terminal is shown. A typical rail-truck intermodal transfer can require about ten labor- and equipment-intensive operations. Higher rail line haul costs of intermodal versus rail carload service reflect the labor, energy, and capital intensive nature of current intermodal and transmodal container transfers. Consequently, reducing the number of operations, and the equipment and labor to perform the operations, there is a need to lower terminal-related transfer costs for inland goods movement.

Total transfer intermodal costs are equally affected by the distance of drayage, equipment utilization (truck/chassis) in both directions, and the time required of drivers to pick up and drop off containers at the terminal and the distribution center. Except for the very largest of customers, most notably UPS and the US Postal Service, intermodal drayage service increasingly has been provided by independent truckers, with independent third-party agents selling the service. Intermodal rail terminals must transport and stack containers at remote sites because these third party agents do not pick up containers sequentially—as they are unloaded. Containers are picked up, usually before incurring a demurrage charge, at the convenience of the customer who often uses the ports and rail terminals as supply chain buffers. The free time allowance varies by terminal, generally 3 or more days at the ports and 24 to 48 hours at high volume rail terminals.

High volume and long dwell time requires inbound containers to be shuttled to a remote storage yard to await pickup, and containers have to be shuttled from a remote storage area to the ramp operation for loading onto a double-stacked car for outbound service. Trackside storage and large overhead cranes are not used at terminals using conventional operating methods, despite its many advantages (e.g, reduced number of lifts and shuttling of containers from remote storage), because it would generate too much congestion within the terminal by trucks waiting in line for the overhead crane to load or unload containers to or from the trackside storage area to the truck line carrier's chassis.

Inbound container operations, are shown in FIG. 1. They typically require the following steps: First, shown as step 1, Inter Box Connectors (IBC's) are unlocked. Second, shown as item 2, a chassis is removed from a storage area and brought trackside. At step 3, a top container is unloaded to a chassis from a railcar. At step 4, the IBC's are removed and put in a pocket of a railcar. At step 5, a hostler hooks up the chassis. At step 6, a hostler brings a container to a remote storage area. At step 7, the container is unloaded at the storage area. At step 8, a drayage driver checks in at an entrance gate and is provided the location of a container to be picked up. At step 9, a crane loads a container on a chassis. And, at step 10, a drayage driver checks out at an exit gate. Generally, steps 2, 3, 5-10 are repeated for a container in a bottom cell of a double stack railcar.

In terminal applications, there are three main logistic processes that interact with each other: (1) loading and unloading containers from trains and ships; (2) storing containers; and (3) receiving and delivering containers. Devices and systems to streamline and make seamless these processes and simplify transfers are needed, to improve reliability and reduce the transfer costs.

In more detail, a top priority in the transportation industry, and particularly in hub, rail and port intermodal applications, is to minimize dwell time. For example, it is desirable to have the shortest time possible to load and/or reload containers to and from double stack railcars to storage areas, commonly stacked in proximity to tracks. Thus, it is desirable to reduce the time to unload and reload containers between double stack railcars and storage area, in rail and hub applications. There is a similar desire in port applications.

It would be beneficial to have a device, such as an OBC, to install an interlock system from a side in proximity to corner fittings and/or corner castings, which are on many conventional containers.

It would also be desirable to have an OBC adapted to connect and disconnect containers from a side, in connection with double stack railcar applications. For example, a device which can easily allow a worker to disconnect it from two containers when a train arrives at an intermodal terminal, and then allows a crane operator to unload the two containers and reload a double stack railcar with two new containers, in a minimal number of cycles. For example, once a locomotive releases a train in a terminal or hub, it would be beneficial to have a device and method, such as an OBC, which allows a worker to easily release and remove it and allows a crane operator to unload a top and bottom container immediately, resulting in emptying a first double stack can quickly. The crane operator can then reload the double stack car with different containers quickly.

In contrast, conventional Inter Box Connectors (IBCs) in a double stack railcar application, require: 1. a worker to release or unlock an IBC; 2. an overhead crane operator to remove a top container; 3. a worker to remove the IBC from a corner casting in a bottom container; and 4. an overhead crane operator can then remove a bottom container to a storage area. This process is slow, cumbersome and labor intensive.

There is a need for an improved device and method to transport and handle containers in and out of hubs and terminals, which is fast, simple and less labor intensive.

DETAILED DESCRIPTION OF THE DRAWINGS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Before describing in detail embodiments that are in accordance with the present invention, it should be observed that the present invention resides primarily in apparatus components and combinations of method steps related to the housing and integral user interface. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
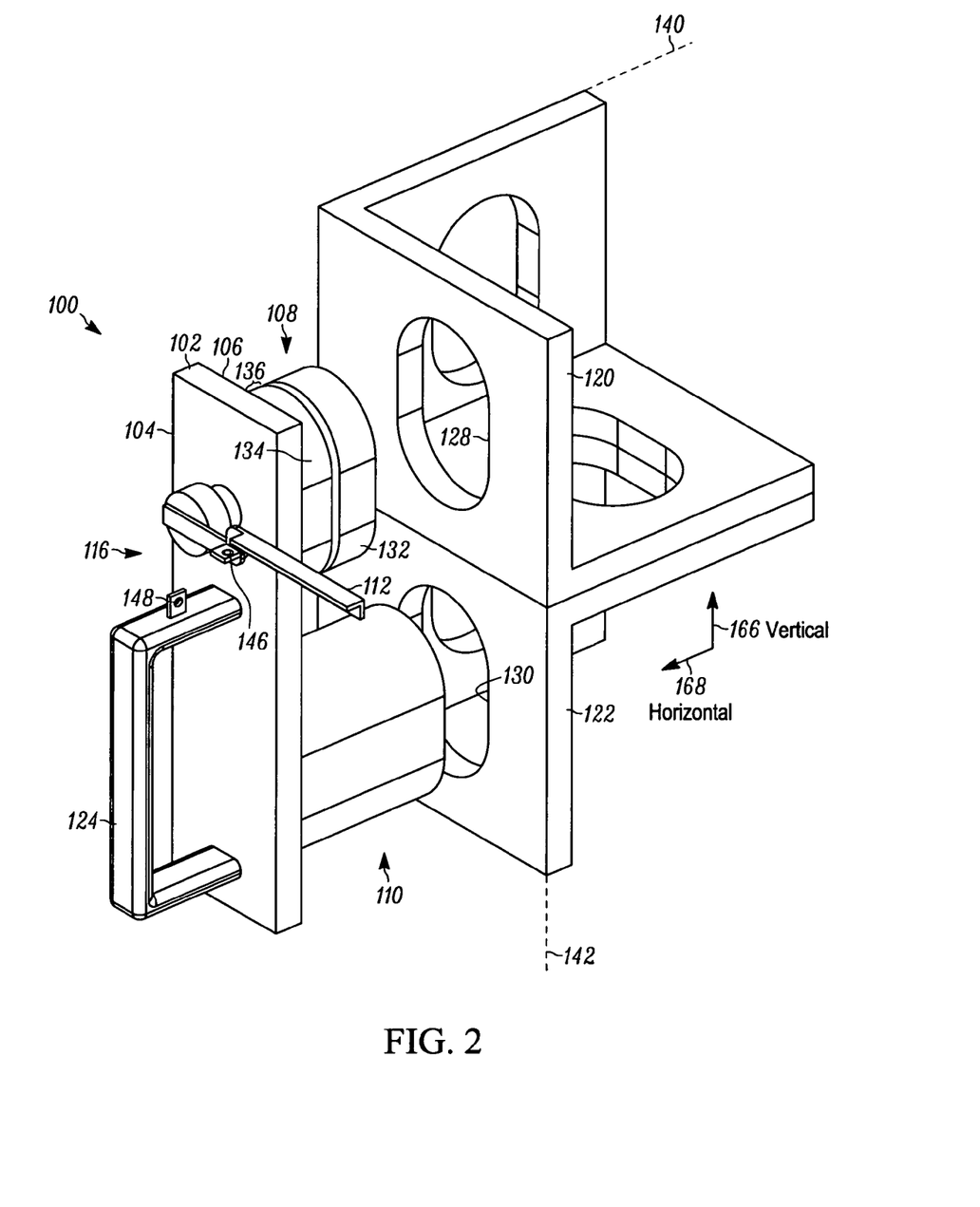
FIG. 2 is a perspective view of an outer box connector (OBC) 100 with anchors 108 and 110 positioned, configured and aligned to be inserted into complementarily configured receptacles 128 and 130 of corner fittings 120 and 122, with a lever 112 extending horizontally, indicating an unlocked condition 116, in accordance with an embodiment of the invention.

In its simplest form, an outer box connector (OBC) is shown as 100, in the figures. In FIG. 2, the OBC 100 can include: a body 102 having an outer surface 104 and an inner surface 106; a first anchor 108 and a second anchor 110 extending inwardly from the inner surface 104; a lever 112 extending substantially outwardly from the outer surface 104, the lever 112 being connected to a distal portion 132 of the first anchor 108; and the first anchor 108 including an unlocked condition 116 adapted for allowing insertion in and removal from a corner fitting 120 and a locked condition 118 for locking the first anchor 108 with a corner fitting 120. Advantageously, the OBC allows simplified connection and disconnection in transportation applications.

In one arrangement, the outer surface 104 includes a handle 124 adapted for carrying the outer box connector. This structure provides simplified handling, for example, for carrying, inserting and removing from a corner fitting.

Figure 3:
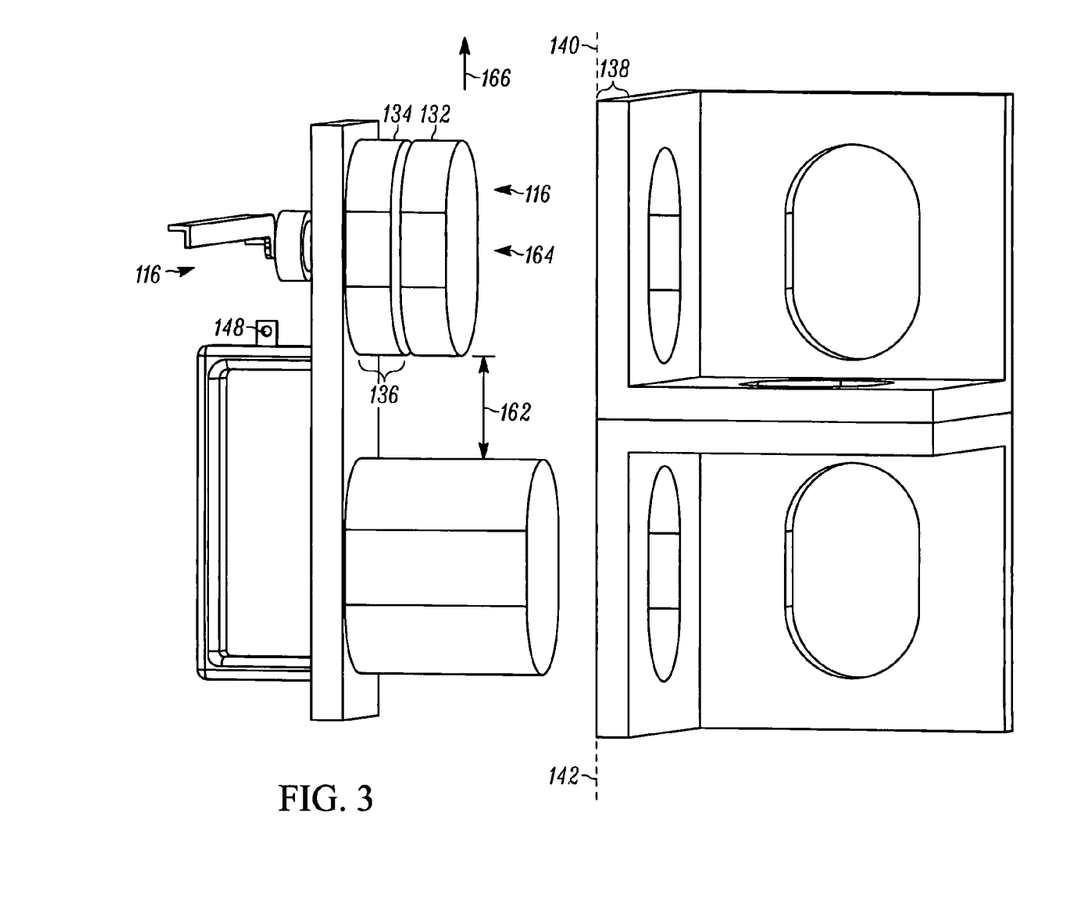
FIG. 3 is a side view of an outer box connector (OBC) 100 with anchors 108 and 110 positioned, configured and aligned to be inserted into complementarily configured, generally oblong, receptacles 128 and 130 of corner fittings 120 and 122, with a lever 112 extending horizontally, indicating an unlocked condition 116, in accordance with an embodiment of the invention.
Figure 4:
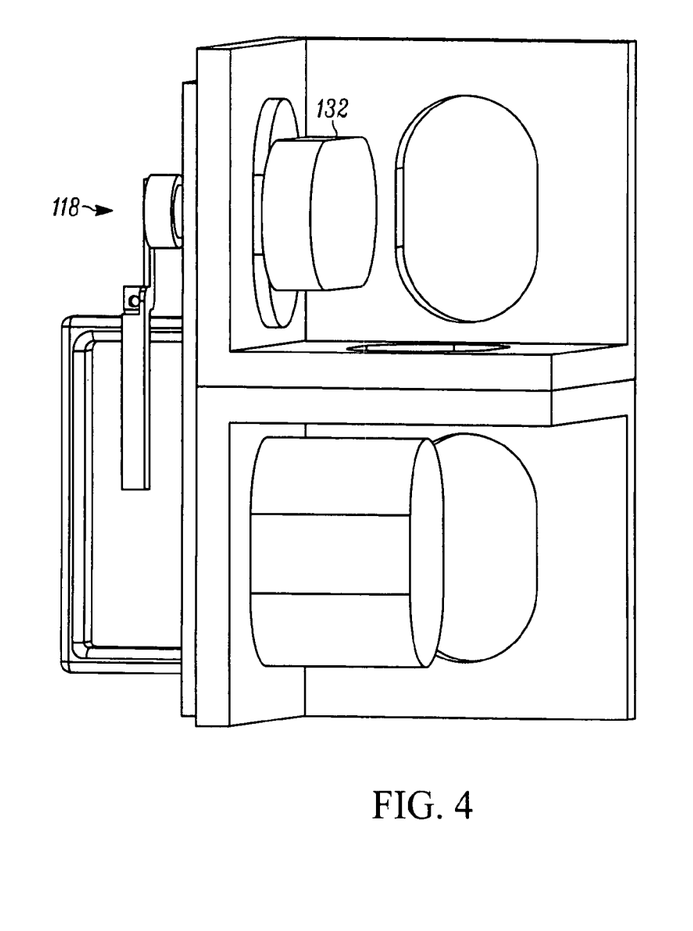
FIG. 4 is a side view of an outer box connector (OBC) 100 with generally oblong anchors 108 and 110 positioned, configured and inserted into complementarily configured receptacles 128 and 130 of corner fittings 120 and 122, with a distal portion 132 of the anchor 108 extending generally horizontally and the lever 112 extending vertically, indicating a locked condition 118, in accordance with an embodiment of the invention.
Figure 5:
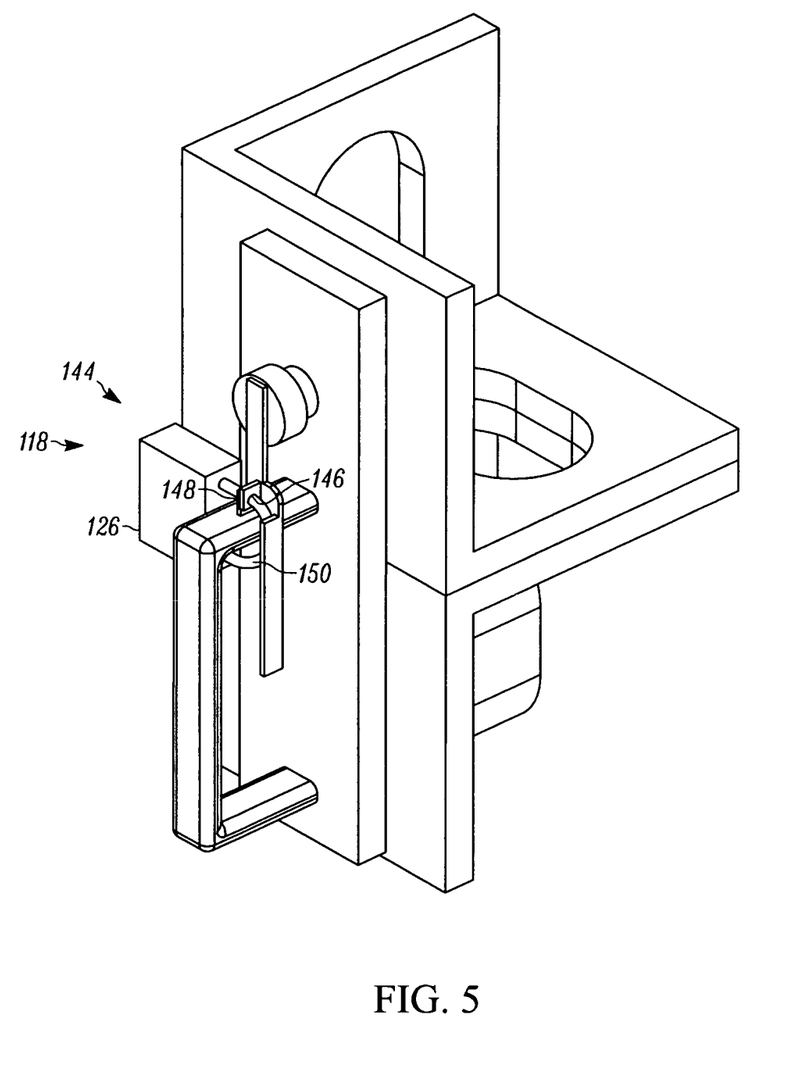
FIG. 5 is a perspective view of an outer box connector (OBC) 100 with the anchors 108 and 110 inserted into receptacles 128 and 130, with a distal portion 132 of the anchor 108 extending generally horizontally and the lever 112 extending vertically, indicating a locked condition 118, and with an external padlock 126, in accordance with an embodiment of the invention.

In one embodiment, the unlocked condition 118 in FIGS. 2 and 3, includes the lever 112 extending substantially horizontally (a horizontal direction or axis is shown as item 168 in FIG. 2), indicating a flagged, unlocked condition 116. Stated differently, the lever 112 defines a rotatable arm extending horizontally indicating to a worker that the OBC is unlocked. As shown in FIGS. 4 and 5, the locked condition 118 includes the lever 112 extending substantially vertically (a vertical direction or axis is shown as item 166 in FIG. 2), indicating a locked condition 118, which is visible to a worker from a distance.

As depicted in FIG. 5, in one embodiment, when in the locked condition 118, the lever 112 and a handle 124 are connectable with an external lock 126, such as a padlock, for improved tamper resistance.

In one arrangement, the first and the second anchors 108 and 110 are generally similarly shaped, as shown in the figures. As should be understood by those skilled in the art, the shapes can vary greatly. In a preferred arrangement, the anchors 108 and 110 are generally oblong in a vertical direction with anchor receptacles 128 and 130 similarly shaped to receive them, as shown in FIGS. 2-4. This structure provides improved and simplified connection and disconnection between the OBC 100 and corner fittings 120 and 122, as detailed herein. The first and the second anchors 108 and 110 can provide a rotatable locking probe and stationary probe, respectively, for enhanced tamper resistance and improved handling.

In a preferred embodiment as shown in FIG. 3, the first anchor 108 can include a distal portion 132 and a proximal portion 134, the proximal portion 134 being stationary and the distal portion 132 being rotatable, between a locked and unlocked position. The proximal portion 134 can extend a predetermined distance 136, as best shown in FIG. 3, providing a spacer structure, which can be substantially the same as a certain thickness 138 of a corner fitting 120. Continuing, the first anchor 108 and the second anchor 110 can extend inwardly past a certain thickness 138 of the corner fittings 120 and 122, to provide a secure fit and connection between the OBC 100 and corner fittings and containers.

In one arrangement, as shown in FIG. 5, a supplemental lock assembly 144 can be utilized, which can include the lever 112 having a lever via 146 and the handle 124 having a handle via 148, adapted to receive an arm portion 150 of an external lock 152, when the first anchor 108 is in the locked condition 118.

Figure 6:
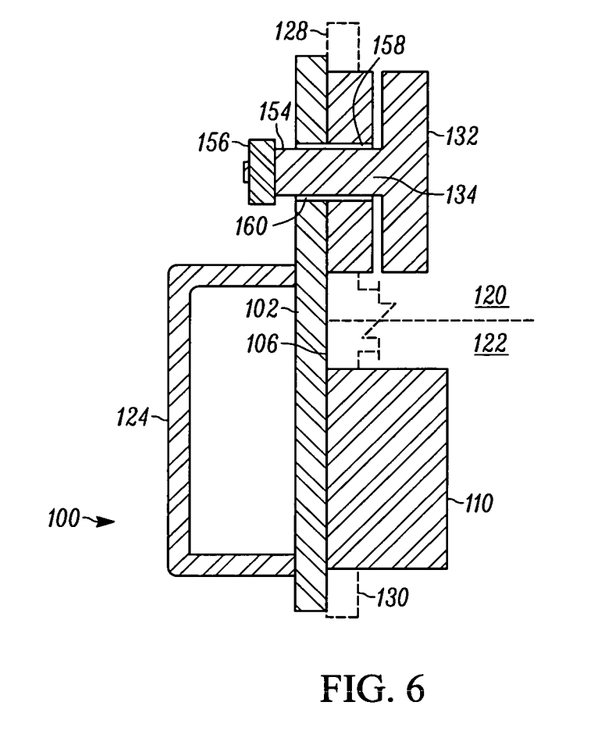
FIG. 6 is a simplified, partial cute away view of an outer box connector (OBC) 100 with anchors 108 and 110 inserted into complementarily configured receptacles 128 and 130 of corner fittings 120 and 122, with the distal portion 132 extending vertically and the lever 112 extending horizontally, indicating an unlocked condition 116, in accordance with an embodiment of the invention.

FIG. 6 is a simplified, partial cute away view of an outer box connector (OBC) 100 with anchors 108 and 110 inserted into complementarily configured receptacles 128 and 130 of corner fittings 120 and 122, with the distal portion 132 extending vertically and the lever 112 extending horizontally, indicating an unlocked condition 116.

In connection with the first anchor 108 in FIG. 6, a stem 154 can connect a rear portion 156 of the lever 112 to a distal portion 132 of the first anchor 108. The stem 154 can extend through a distal hole 158 in the body 102 and a proximal hole 160. The distal 158 and proximal holes 160 are aligned to allow the stem 154 to rotate freely therethrough, to allow twistlock and unlock actions, as detailed herein.

The body 102 is designed to be portable, light weight and adapted for being handled by a worker, generally from the outer surface 104, to simplify connection and disconnection to a structure. In a preferred embodiment, the OBC 100 is connectable to at least one of a railcar, truck chassis and container.

Figure 7:
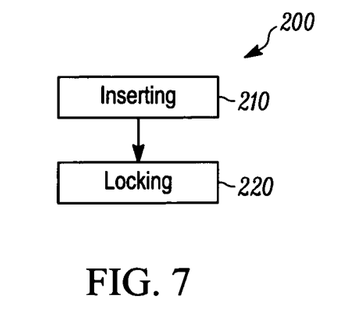
FIG. 7 is a simplified block diagram of a method for installing an outer box connector 200, in accordance with an embodiment of the invention.

In another embodiment, a method for installing an outer box connector 200, is shown and described in connection with FIG. 7. The method 200 can include: inserting 210 an outer box connector 100 having a first and a second anchor 108 and 110 extending inwardly into corner fittings 120 and 122 with receptacles 128 and 130 of adjacent bodies/containers 140; and locking 220 at least the first anchor 108 with one of the receptacles 128 and 130 of the corner fittings 120 and 122, such that a distal portion 132 of the first anchor 108 is rotated so as to be at least temporarily prohibited from being removed from the corner fitting 120.

Advantageously, a worker can easily install, connect or disconnect an OBC 100 to a body/container 140. This method can facilitate connecting, disconnecting, loading and unloading of containers on railroad cars, such as piggy backed cars, chassis', bodies as well as other forms of transportation.

In one embodiment, the step of inserting 210 can include at least one of: aligning the first and second anchors 108 and 110 with the adjacent corner fittings 120 and 122, before insertion; configuring and dimensioning the first and second anchors 108 and 110 to be received in and removable from the receptacles 128 and 130 of adjacent corner fittings 120 and 122, wherein the first and second anchors 108 and 110 are complementarily configured with respect to the receptacles 128 and 130; and configuring the first and second anchors 108 and 110 at a predetermined distance 162, to be easily received in the receptacles 128 and 130 of adjacent corner fittings 120 and 122. The distance 162, as shown in FIG. 3 is specially chosen to provide a secure interlock between both anchors 108 and 110, in the receptacles 128 and 130, for improved locking and interconnection and tamper resistance.

Preferably, the method 200 includes providing the outer box connector 100 with an unlocked condition 116 configured to allow insertion and removal from a corner fitting and a locked condition 118, for improved handling and installation and removal. The unlocked condition 116 can include a lever 112 extending substantially horizontally indicating a flagged, unlocked condition for enhanced visibility by a worker and the locked condition 118 includes the lever 112 extending substantially vertically indicating a locked condition for enhanced visibility at a distance, by a worker.

The method 200 can include configuring the first and the second anchors 108 and 110 to be generally similarly shaped, preferably in an oblong configuration in a vertical direction, for improved locking.

The method 200 can also include: configuring the first anchor 108 to include a distal portion 132 and a proximal portion 134, the proximal portion 134 being stationary and the distal portion 132 being rotatable; and configuring the second anchor 110 to be stationary. This feature can provide or improved handling, locking, installation and removal, for example.

Figure 8:
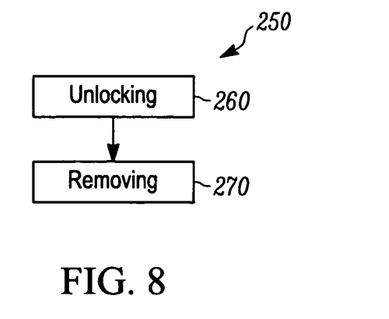
FIG. 8 is a simplified block diagram of a method for removing an outer box connector 250, in accordance with an embodiment of the invention.

In one embodiment, the method 200 can include: aligning an outer box connector 100 including a first and a second anchor 108 and 110 extending inwardly into corner fittings having receptacles 128 and 130; configuring the first and the second anchors 108 and 110 to be received in the receptacles 128 and 130; inserting 210 the first and the second anchors 108 and 110 into the receptacles 128 and 130; and locking 220 at least the first anchor 108 with at least one of the corner fitting receptacles 128 and 130, such that a distal portion 132 of the first anchor is rotated so as to be at least temporarily prohibited from being removed from the corner fitting 120. The method provides an improved locking condition with enhanced tamper resistance, when locked with an external lock In another embodiment, a method for removing an outer box connector 250 is shown and described in connection with FIG. 8. The method 250 can include the steps of: unlocking 260 an outer box connector 100, by rotating a lever 112 such that a distal portion 132 of the first anchor 108 is rotated to an unlocked condition 116; and removing 270 the anchors 108 and 110 from the receptacles 128 and 130. This embodiment provides enhanced unlocking, handling and/or removal.

As detailed previously with regard to a preferred embodiment and as shown in the figures, the OBC 100 is particularly configured to allow simplified handling, insertion and removal from the receptacles 128 and 130. This can be accomplished by the distal portion 132 being aligned with the proximal portion 134 of the first anchor 108 when in the unlocked condition 116. And in the locked condition 118, the distal portion 132 is shown being generally perpendicular with the proximal portion 134, to provide a secure lock or interconnection.

The method 250 can include providing the outer box connector 100 with an unlocked condition 116 including a lever 112 extending substantially horizontally indicating a flagged, unlocked condition and wherein the locked condition 118 includes the lever 112 extending substantially vertically indicating a locked condition, both being highly visible by a worker.

As should be understood, the matter set forth in the foregoing description and accompanying drawings is offered by way of illustration only and not by limitation. While particular embodiments have been shown and described, it will be apparent to those skilled in the art that changes and modifications may be made without departing from the broader aspects of Applicant's invention.

What is claimed is:

1. An outer box connector for connecting first and second corner fittings each having an anchor receptacle formed in a wall thereof, the connector comprising:
   an elongate body having an outer surface and an opposing inner surface;
   first and second anchors spaced vertically from each other and extending horizontally from the inner surface towards the respective anchor receptacles of the first and second corner fittings, wherein the first and second anchors are shaped for mating insertion into the anchor receptacles, and wherein the first anchor includes:'
   a stationary proximal portion fixed to the inner surface of the body and extending from the inner surface by a distance substantially equal to a thickness of the wall of the first corner fitting, wherein a rotatable stem is received in a through hole extending through the body and the proximal portion, and
   a rotatable distal portion fixedly connected to a distal end of the stem and rotatable about the through hole; and
   a lever pivotably connected to the outer surface of the body, and connected to a proximal portion of the rotatable stem;
   wherein when the connector is moved horizontally towards the corner fittings such that the first and second anchors insertingly engage the respective anchor receptacles of the corner fittings, the connector is movable between:
   an unlocked condition, wherein the lever is positioned such that the distal portion of the first anchor is aligned with the anchor receptacle; and
   a locked condition, wherein the lever is pivoted so as to rotate the distal portion of the first anchor out of alignment with the anchor receptacle.

2. The outer box connector of claim 1, wherein the outer surface includes a handle adapted for carrying the outer box connector.

3. The outer box connector of claim 1, wherein the unlocked condition includes the lever extending substantially horizontally indicating a flagged, unlocked condition.

4. The outer box connector of claim 1, wherein the locked condition includes the lever extending substantially vertically indicating a locked condition.

5. The outer box connector of claim 1, wherein the locked condition includes the lever extending substantially vertically indicating a locked condition, wherein when in the locked condition, the lever and a handle are connectable with an external lock.

6. The outer box connector of claim 1, wherein the first and the second anchors have an oblong shape.

7. The outer box connector of claim 1, further comprising a supplemental lock assembly comprising the lever having a lever via and a handle having a handle via, which when aligned are adapted to receive an arm portion of an external lock when the first anchor is in the locked condition.

8. The outer box connector of claim 1, wherein the body is portable and adapted for being handled from the outer surface.

9. The outer box connector of claim 1, wherein the body is connectable to a railcar.

* * * * *